Sept. 9, 1930. M. SCHLEICHER ET AL 1,775,502
APPARATUS FOR MEASURING EARTH RESISTANCES
Filed March 10, 1925
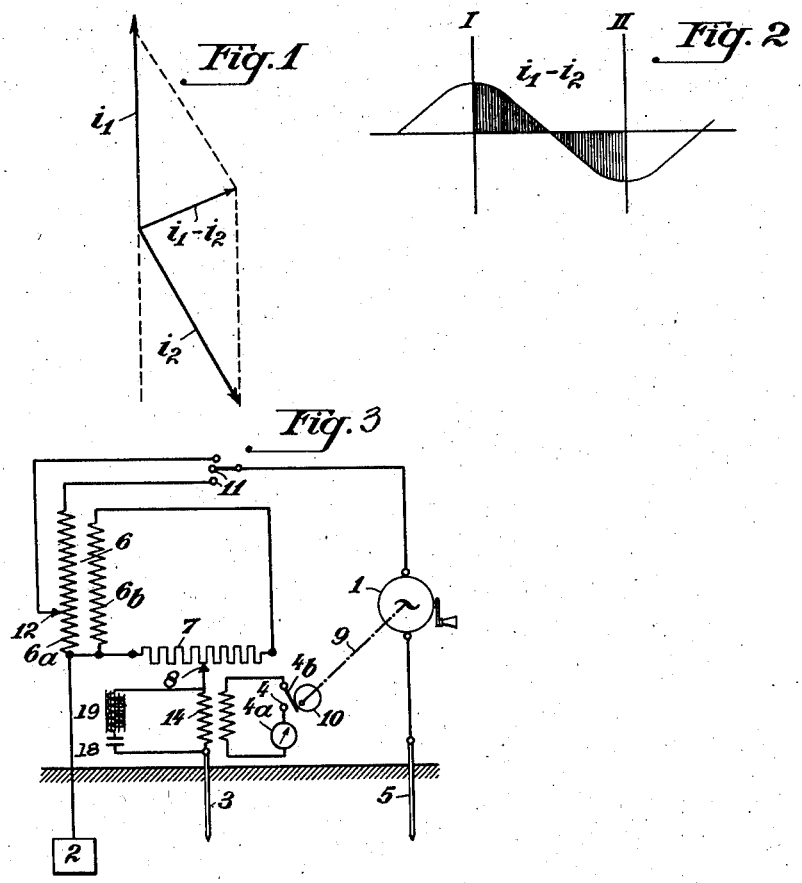

Patented Sept. 9, 1930

1,775,502

UNITED STATES PATENT OFFICE

MANFRED SCHLEICHER, OF BERLIN-CHARLOTTENBURG, DIETER ALBRECHT, OF BERLIN, AND WILHELM GAARZ AND GEORG KEINATH, OF BERLIN-CHARLOTTENBURG, GERMANY, ASSIGNORS TO SIEMENS & HALSKE, AKTIENGESELLSCHAFT, OF SIEMENSSTADT, NEAR BERLIN, AND ELSEWHERE, GERMANY, A CORPORATION OF GERMANY

APPARATUS FOR MEASURING EARTH RESISTANCES

Application filed March 10, 1925, Serial No. 14,587, and in Germany March 15, 1924.

Our invention relates to an apparatus for measuring earth resistance and diffusion resistance. Two types of apparatus have been used for this purpose hitherto. In one of them, the measurement is effected with the aid of telephones or other instruments which depend on the keenness of perception or other personal characteristics of the operator, and the results therefore are unreliable, since their accuracy depends on the greater or smaller skill and subjective qualities of the operator, such as the quality of his hearing, when telephones are employed in connection with the measuring apparatus. The other type embodies the use of a so-called zero method, that is, the apparatus includes a circuit with an indicating device having a scale, and proper adjustment is made until no current flows in such circuit and the indicating device therefore points to zero. This method, while theoretically superior to the first, offers great disadvantages in its practical use owing to the complication of the procedure and the numerous possibilities of error.

Our invention relates to instruments of the second type mentioned above, and has for its object to provide an apparatus operating according to the zero method but avoiding the drawbacks which have so far interfered with the satisfactory use of zero-method apparatus. The improved apparatus is protected against the disturbing effect of extraneous currents, and is simpler both in construction and operation than apparatus of the same type employed hitherto. Stray currents resulting from leakage of electricity into the earth from light or power lines, or due to atmospheric or magnetic disturbances, are among the causes that have interfered with the accuracy of measurements hitherto, and special difficulties are encountered in eliminating the influence of such earth currents, because their strength varies at different points at which it may be desired to take measurements. Insofar as the disturbing currents are of the alternating character, we eliminate their influence by providing, in parallel with the measuring instrument proper, a shunt path which acts as a short-circuit only for definite selected undesired frequencies. Errors that might be produced by stray currents of the direct character are eliminated by providing inductive (transformer) coupling between the circuit containing the measuring instrument proper and the circuit carrying the undesired stray direct current. The alternating current to be measured is first rectified, and the measuring instrument is placed in the circuit of the rectified current; by the use of an instrument responsive to direct current, the zero adjustment can be effected more quickly and with greater accuracy. The disturbing influence of the phase difference between the two circuits coupled by the transformer is overcome in a very simple manner by means of a switch operated in synchronism with the alternating current generator which produces the testing current. In contradistinction to previous arrangements, this switch is actuated in such a manner as to open and close the measuring circuit (where the zero indication is to be observed) alternately for a half-wave or half-cycle, such opening and closing occurring at the moment the current in the measuring circuit attains its maximum and its minimum respectively. Three electrodes affording separate ground connections are employed, and the operation consists simply in adjusting a variable ohmic resistance forming part of the apparatus, until the measuring instrument proper (a galvanometer being generally employed) indicates that no current is flowing through the circuit of such measuring instrument. The pointer or other adjustable member co-operating with said resistance will then indicate the resistance for the determination of which the instrument is employed, Reference is to be had to the accompanying drawings, in which Figs. 1 and 2 are diagrams illustrating the principle of our invention, and Fig. 3 is a diagrammatic view showing a preferred and satisfactory form of measuring apparatus embodying our invention.

In Fig. 1, $i_1$ indicates an alternating current which is generated from any suitable source and transmitted into the earth via the primary of a transformer. The current flowing through the secondary of such transformer is designated by $i_2$; the strength of such secondary current will depend on the transformer ratio and on the amount of a (variable) ohmic resistance in series with the secondary of the transformer. The potential drop in this variable or adjustable resistance is proportional to the secondary current $i_2$, while the potential drop in the earth, between grounded conductors (such as 2 and 3 in Fig. 3) connected with the slider or other adjusting member of such variable resistance, and with the primary respectively, is proportional to the current $i_1$. The said slider is then adjusted until the potential drop in that portion of the resistance which is between the slider and the ground connection of the primary (in Fig. 3, the portion of the resistance 7 to the left of the slider 8) is equal to the potential drop between the two ground connections mentioned above (2 and 3 in Fig. 3). As the said resistance has been calibrated, the position of the slider and the predetermined relation of the currents will afford the necessary data for calculating the earth resistance; in fact, the slider might be constructed as a pointer indicating such earth resistance directly on a suitable scale. When this adjustment of the ohmic resistance has been made, the potential difference between the slider and its ground (that is, in Fig. 3, the potential difference between 8 and 3) would be equal to zero, and therefore no current would flow through this "measuring portion" of the circuit, if it were not for the fact that there is a phase difference between the currents $i_1$ and $i_2$. Owing to this phase difference, there would flow through said measuring portion at all times, an error-producing current proportional to the difference between said currents, that is, proportional to $i_1 - i_2$, as indicated in the diagram Fig. 1. According to our invention, the disturbing effect of this current is eliminated by reversing the rectifier at the moment that said current $i_1 - i_2$ attains its maximum or minimum; this reversing or switching of the rectifier is illustrated in Fig. 2, which indicates which parts of the alternating current wave are utilized for the rectified current. I and II indicate the moments when the alternating current is switched on and off respectively, so that the hatched spaces indicate the fluctuation in current intensity while the current is switched on. It will be noted the current is negative during one half of this time, and positive during the other half, so that the effects of this alternating current $(i_1 - i_2)$ on the galvanometer or like measuring instrument are neutralized.

Fig. 3 shows the circuit arrangements of the apparatus, as an example. At 1 we have indicated a source of alternating current, preferably an inductor which provides the test or measuring current $i_1$, which is sent through the test resistance, for instance, the diffusion resistance of a test plate 2. The test current $i_1$ flows from the plate 2 over a rod 3, which serves as connection for the indicator 4, to an auxiliary ground 5 and from this back to the source 1. In the outer part of the circuit the primary coil $6_a$ of a transformer 6 is located, the secondary coil of which is closed by an adjustable resistance 7. The circuit formed by $6_b$ and 7 are traversed by the current $i_2$. One pole of the adjustable resistance is connected to the conductor of the test plate 2. The resistance comprises a sliding contact 8. Between the contact 8 and the sounding rod 3 the indicating device 4 is arranged which consists of a transformer 14, a galvanometer $4_a$ and a rectifier, preferably an interrupter $4_b$, which cuts out the alternating current flowing in the instrument 4 during a half period. The interrupter is operated from a shaft which is coupled to the current generator 1 in such a manner that the interruption takes place with the frequency of the current generator. The dot and dash line 9 indicates the shaft, on which an eccentric 10 is situated, by means of which the point of interruption can be regulated when rotating it in relation to the shaft. In the circuit of the current $i_1$ a switch board 11 may be arranged which by means of the shiftable contact 12 permits the sending of the test circuit also through only a part of the primary windings $6_a$ of the transformer. In the reversed relation to that of the currents $i_1$ and $i_2$ the resistance to be measured are standing at the zero-position of the galvanometer $4_a$. It is thus possible to measure earth and other diffusion-resistances of different values by means of a given standard resistance by changing the transforming ratio of the transformer.

In the connection described above there may also be prevented the influence of a direct current producing source of faults, upon the indicating device. Such source of faults is the electromotive force of the earth. This fault is remedied by the fact that, as shown in Fig. 3, the indicator 4 is not coupled directly between the sounding rod 3 and the sliding contact 8 but over a transformer 14, the primary winding of which is connected to the sounding rod 3 and the sliding contact 8. The direct current in the primary winding of the transformer 14 created by the electromotive force in the earth, has no effect upon the secondary winding. The change in the energization of the transformer created by the direct current is of no disadvantage as it has no effect upon the zero-adjustment.

In order to protect the indicating device 4 also against current due to a fault in the network, or main current carrying line, it is suitable to connect a shunt to the primary winding of the insulating transformer 14. This shunt may conveniently be formed by means of a condenser 18 and a choking coil 19 which is tuned to the network frequency. As a result of this, any alternating current having the normal or usual frequency of the alternating current network will not pass through the primary winding of the transformer 14, but through the shunt connected in parallel to such primary winding. Thus currents having the frequency of the network will be kept away from the galvanometer (measuring instrument) $4_a$. On the other hand, with reference to the measuring current, the frequency of which differs from the normal frequency of the network, the shunt constitutes a high resistance, so that the measuring current will pass through the primary winding of the transformer 14 and affect the measuring instrument $4_a$ accordingly. This protection for the direct current indicator $4_a$ will prevent surging, between the network frequency and the frequency of the measuring current, from passing into the range of the mechanical resonance of the movable system in the direct current indicator, in which case very great, and on account of the irregularity of the frequency of the measuring current source, also very irregular deflections, will take place. If desired the transformer 14 can be omitted in this connection, in which case the shunt is connected in parallel with the indicator.

What we claim as our invention and desire to secure by Letters Patent is:

1. An apparatus for measuring the earth-resistance of a grounded body, comprising a source of alternating current, an auxiliary body for grounding one pole of said source, a transformer, means for connecting the primary of said transformer to the other pole of said source, means for connecting another point of said primary with the first-mentioned grounded body, a resistance, another grounded auxiliary body, a regulating device for connecting said last-mentioned auxiliary body with said resistance at different points thereof, connections from said resistance to the secondary of said transformer, an electric measuring instrument for measuring the current which flows between said regulating device and the last-mentioned auxiliary body, and a switching device for causing the current to flow and to be interrupted periodically through said measuring instrument, in such manner that the effect on such instrument of the alternating current traversing the measuring circuit when the apparatus is in equilibrium and resulting from the phase difference between the opposing currents in such measuring circuit is neutralized.

2. An apparatus for measuring the earth-resistance of a grounded body, comprising a source of alternating current, an auxiliary body for grounding one pole of said source, a transformer, means for connecting the primary of said transformer to the other pole of said source, means for connecting another point of said primary with the first-mentioned grounded body, a resistance, another grounded auxiliary body, a regulating device for connecting said last-mentioned auxiliary body with said resistance at different points thereof, connections from said resistance to the secondary of said transformer, a second transformer included in the connection between the last-mentioned auxiliary body and said regulating device, a measuring instrument for measuring the current in the secondary of said second transformer, a switching device connected with the secondary of said second transformer, and an operative connection between said switching device and a moving part of said source of alternating current, for causing the secondary circuit of said second transformer to be closed and interrupted periodically in such manner that the effect on such instrument of the alternating current traversing the measuring circuit when the apparatus is in equilibrium and resuslting from the phase difference between the opposing currents in such measuring circuit is neutralized.

3. An apparatus for measuring the earth-resistance of a grounded body, comprising an alternating current generator having a rotary member, an auxiliary body for grounding one pole of said generator, a transformer, means for connecting the primary of said transformer with the other pole of said generator, means for connecting another point of said primary with the first-mentioned grounded body, a resistance, another auxiliary grounded body, a regulating device for connecting the last-mentioned auxiliary body with said resistance at different points thereof, connections from said resistance to the secondary of said transformer, a second transformer the primary of which is included in the connection between the last-mentioned auxiliary body and said regulating device, a measuring instrument for measuring the current in the secondary circuit of said second transformer, a switching device connected with the secondary of said second transformer, an operative connection between said switching device and the rotary member of said alternating current generator, for causing the secondary circuit of said second transformer to be opened and closed periodically, in such manner that the effect on such instrument of the alternating current traversing the measuring circuit when the apparatus is in equilibrium and resulting from the phase difference between the opposing currents in such measuring circuit is neutralized, and a shunt circuit across the primary of said second transformer, said shunt including a condenser and an inductance.

In testimony whereof we affix our signatures.

MANFRED SCHLEICHER.
DIETER ALBRECHT.
WILHELM GAARZ.
GEORG KEINATH.